United States Patent [19]

Honeycutt, Jr. et al.

[11] Patent Number: 4,645,217
[45] Date of Patent: Feb. 24, 1987

[54] FINGER SEAL ASSEMBLY

[75] Inventors: Fred L. Honeycutt, Jr., Lake Park; Robert G. Middleton, Palm Beach Gardens, both of Fla.

[73] Assignee: United Technologies Corporation, Hartford, Conn.

[21] Appl. No.: 803,047

[22] Filed: Nov. 29, 1985

[51] Int. Cl.⁴ .......................... F16J 15/12; F16J 15/22
[52] U.S. Cl. .................................... 277/230; 277/231; 277/234; 277/166
[58] Field of Search ...................... 277/227, 229–234, 277/166, 235 R, 236; 220/221, 222

[56] References Cited

U.S. PATENT DOCUMENTS

| 25,724 | 10/1859 | Colrin | 277/231 |
| 2,124,108 | 7/1938 | Grece | 277/230 X |
| 2,571,817 | 10/1951 | Armstrong | 277/166 X |
| 2,699,349 | 1/1955 | Brownlee | 277/231 |
| 3,199,878 | 8/1965 | Cunningham et al. | 277/95 X |
| 3,381,969 | 5/1968 | Crow et al. | 277/230 X |
| 3,843,278 | 10/1974 | Torell | 277/230 X |

Primary Examiner—Robert S. Ward
Attorney, Agent, or Firm—Jack N. McCarthy

[57] ABSTRACT

A finger seal assembly for use between a stationary member and a movable member is formed of two overlapping metallic members having a solid portion at one end and having fingers at the other end, a layer of high temperature resistant cloth being positioned between said overlapping metallic members; said fingers of one metallic member being bent over the fingers of the other metallic member to hold said fingers together, and said solid portions of said metallic members being welded together, trapping said high temperature resistant cloth between said metallic members. High pressure acts on the inner metallic member to compress the high temperature resistant cloth.

6 Claims, 6 Drawing Figures

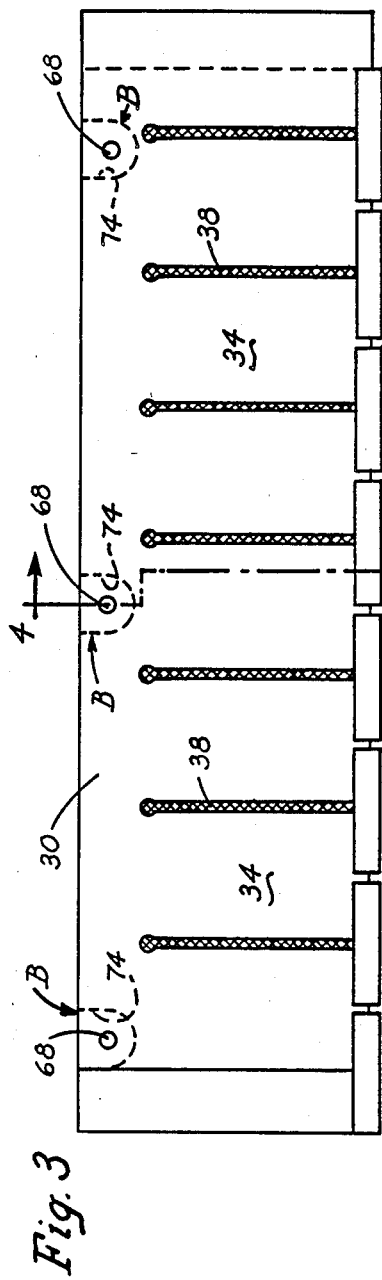
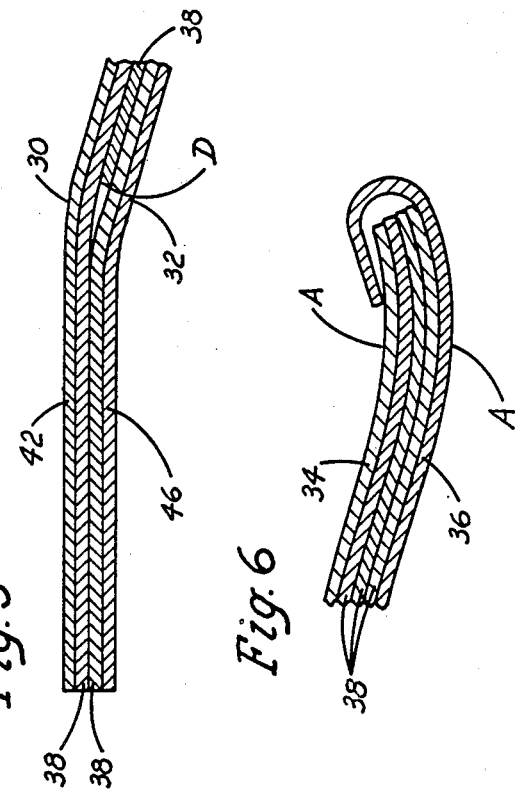
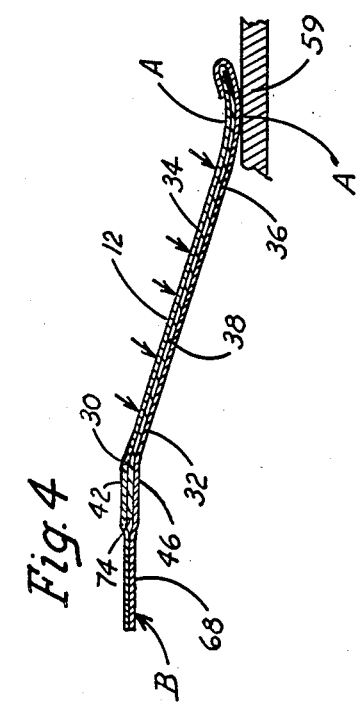

FINGER SEAL ASSEMBLY

DESCRIPTION

1. Technical Field

This invention relates to sealing devices for providing a close seal between a stationary member and a member slidable in relation thereto, especially between an augmentor duct and nozzle actuating sleeve therearound.

2. Background Art

A prior art sealing arrangement is shown in U.S. Pat. No. 3,354,649 which is used between an exhaust duct and a sleeve for actuating an exhaust nozzle; and U.S. Pat. No. 4,022,948 shows a resiliently coated metallic finger seal formed of two metallic seal members. Other patents showing flexible seal members are U.S. Pat. Nos. 2,972,226, 3,721,460 and German Patent No. 25 00 226.

DISCLOSURE OF INVENTION

An object of this invention is to provide a seal construction for a high temperature environment having two overlapping metallic members having flexible finger seals extending therefrom for engaging a sliding surface with the metallic members offset so that the slots between the finger seals of each metallic member are not aligned; a high temperature resistant cloth, or tape, being held in place between the two metallic members, said location of said high temperature resistant cloth preventing direct contact with a hot flow and said location improving durability of the seal since the cloth does not have contact with a moving surface.

A further object of this invention is to provide a seal construction wherein the end of the metallic member contacting the sliding surface curves inwardly and is bent over the other metallic member, trapping the high temperature resistant cloth between the two metallic members.

A further object of this invention is to provide a seal construction wherein the solid edge portion from which the finger seals extend has plug welds extending through openings in the high temperature resistant cloth to form a seal component which is fixed together and ready for installation.

Another object of this invention is to form a seal construction for a sliding annular sleeve wherein the metallic members having finger seals can be formed as arcuate segments, said metallic members being offset so that one metallic member projects from one end and the other metallic member projects from the other end, said adjacent ends overlapping when their adjacent segments are in place; the high temperature resistant cloth covers the projecting end of the metallic member without the curved end which is bent over.

BRIEF DESCRIPTION OF DRAWINGS

FIG. 3 is a view of the inner surface of the seal segment shown in FIG. 1;

FIG. 4 is an enlarged figure taken along the line 4—4 of FIG. 3;

FIG. 5 is a modification of the forward end of a seal segment wherein a plurality of high temperature resistant cloths are used; and FIG. 6 is a view showing the rear end of the modification shown in FIG. 5.

BEST MODE FOR CARRYING OUT THE INVENTION

Figure 1:
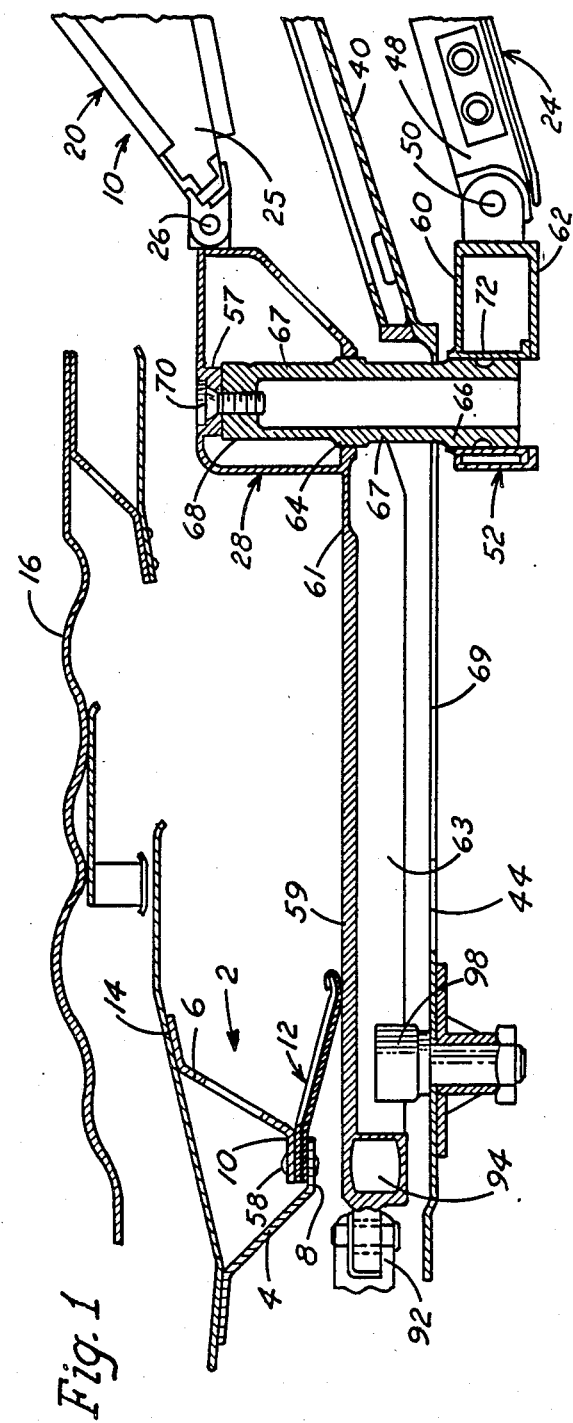
FIG. 1 is a view of a portion of the rear end of an augmentor of a jet engine showing the liner and outer casing with a nozzle actuating cylindrical sleeve mounted therearound for axial movement; a seal construction being positioned between said augmentor casing and cylindrical sleeve.

FIG. 1 shows a portion of the rear end of an augmentor for a jet engine including the end of the augmentor liner 16 and augmentor duct, or casing, 14 with an axially movable nozzle actuating cylindrical sleeve 59 mounted therearound. A supporting sleeve 44 fixed to the augmentor casing, by a conical flange at its forward end (not shown), surrounds said nozzle actuating cylindrical sleeve 59. Roller and track means are positioned at circumferential locations between said supporting sleeve 44 and nozzle actuating cylindrical sleeve 59 to permit axial movement of said nozzle actuating cylindrical sleeve 59 around said augmentor casing 14.

A plurality of rollers 98 are mounted circumferentially around supporting sleeve 44 and extend inwardly therefrom. Each roller 98 extends into a cooperating axial channel 63 formed around the outer surface of nozzle actuating sleeve 59. A second plurality of rollers (not shown) are mounted circumferentially around the rear end 61 of nozzle actuating cylindrical sleeve 59 and extend outwardly therefrom, in the same manner as rollers 98. Each roller extends into an axial channel (not shown) formed around the inner surface of supporting sleeve 44, in the same manner as axial channel 63. Each of the rollers of the second plurality of rollers and the axial channel formed around the inner surface of supporting sleeve 44 are located offset circumferentially between the rollers 98 and axial channels 63 referred to above. A specific showing of this arrangement is shown in U.S. Pat. No. 4,456,178.

A plurality of hydraulic actuators (not shown) are circumferentially spaced apart about the augmentor casing 14 and are secured thereto upstream of the nozzle actuating cylindrical sleeve 59. A plurality of push-pull rods 92 extending from said actuators are connected to a cylindrical ring 94 fixed to the forward end of the nozzle actuating cylindrical sleeve 59 to provide axial movement thereof.

The rearward end 61 of the nozzle actuating cylindrical sleeve 59 is connected to an inner unison ring 28 formed as a box section integral with the nozzle actuating cylindrical sleeve 59; said inner unison ring 28 being pivotally connected at a pivot 26 to the forward end 25 of each upstream convergent flap 20. An outer unison ring 52 is spaced outwardly from said inner unison ring 28 and augmentor casing 14, and connected to the inner unison ring 28 by a plurality of radially extending circumferentially spaced pins 67. Each pin 67 passes through a cooperating axially elongated slot 69 in the supporting sleeve 44, said arrangement permitting axial movement of the pins along with the nozzle actuating cylindrical sleeve 59.

Said outer unison ring 52 is formed as a box section having a radial opening 66 therethrough formed by a bushing 72 fixed within the box of the outer unison ring 52; said outer unison ring 52 being pivotally connected at a pivot 50 to the forward end 48 of each external flap 24. It can be seen that when the outer unison ring 52 is placed around the augmentor casing 14 in line with the inner unison ring 28, each pin 67 can be inserted through the bushing 72, aligned slot 69, and an opening 64 in the bottom of the inner unison ring 28 into the interior thereof where its free end meets an enlarged portion 57 at the top thereof. A bolt 70 extends through a hole in each enlarged portion 57 and is threaded into a threaded hole in the end of pin 67 to fix the pins 67 in place.

The rearward ends of each convergent flap 20 and external flap 24, are pivotally connected to a divergent flap (not shown) at spaced locations; each convergent flap 20 having a roller (not shown) for riding in a cam track 40. It can be seen that axial movement of the nozzle actuating cylindrical sleeve 59 by push-pull rods 92, also axially moves the unison rings 28 and 52 and the forward ends 25 and 48, respectively, of the convergent flap 20 and external flap 24. This axial movement of the convergent flap 20 and external flap 24 changes the position of the nozzle flaps for engine control. A specific showing of this flap construction is shown in U.S. Pat. No. 4,456,178. Many other flap constructions can be used, such as the one shown in U.S. Pat. No. 2,972,226.

To prevent cooling gas flow exiting from between said augmentor casing 14 and said augmentor liner 16 from leaking forwardly between said augmentor casing 14 and nozzle actuating cylindrical sleeve 59, a seal construction 2 is provided. A similar jet engine construction having a different arrangement is shown in U.S. Pat. No. 3,354,649, where an axially movable sleeve is moved around the end of an exhaust duct, by actuators to control the position of the nozzle flaps of the nozzle assembly.

The seal construction 2 comprises two annular supporting flanges 4 and 6 connected to the external surface of the end of said augmentor duct 14 inwardly of the nozzle actuating cylindrical sleeve 59. Supporting flange 4 is the forward flange and extends rearwardly and outwardly at an angle from said augmentor duct 14 and supporting flange 6 is located rearwardly of flange 4 and extends forwardly and outwardly at an angle from said augmentor duct 14 to cooperate with the outer end of supporting flange 4. Said flanges 4 and 6 form a conical cross-section.

Tho outer end of flange 4 has a rearwardly extending cylindrical portion 8 and the outer end of flange 6 has a forwardly extending cylindrical portion 10, cylindrical portion 10 being positioned inwardly of cylindrical portion 8 a small distance, forming a rearwardly facing annular space positioned within the nozzle actuating cylindrical sleeve 59.

Figure 2:
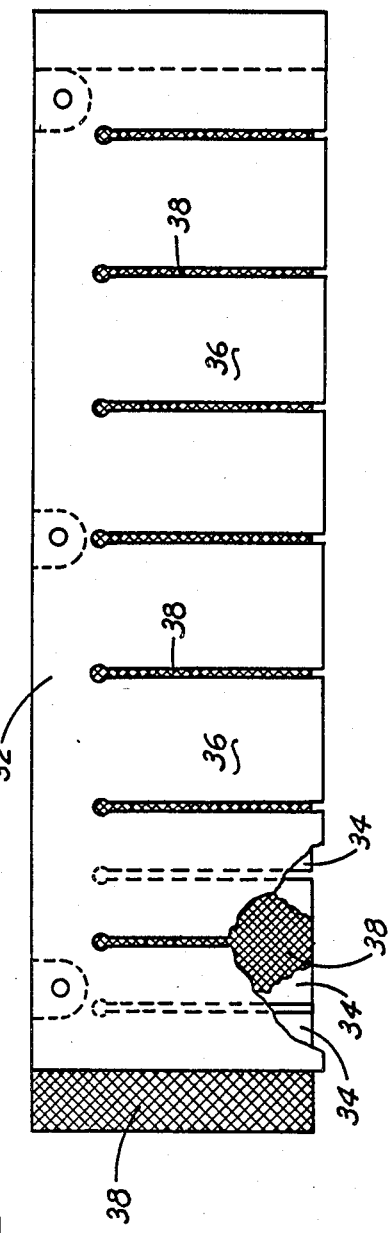
FIG. 2 is an enlarged view of the outer surface of a seal segment.

A finger seal means 12 extends between the flanges 4 and 6 and the nozzle actuating cylindrical sleeve 59. The finger seal means 12 includes two metallic members 30 and 32 having flexible fingers 34 and 36, respectively. The finger seal means 12 is formed as an arcuate segment, one segment being shown in FIGS. 2 and 3.

A high temperature resistant cloth 38 is placed between said metallic members 30 and 32 to seal the slots between the fingers 34 and 36 and prevent flow therebetween. Each metallic member 30 and 32 is formed having an arcuate solid portion 42 and 46, respectively, to be positioned in the opening between the cylindrical portions 8 and 10 of flanges 4 and 6 with high temperature resistant cloth 38 therebetween. The fingers 34 and 36 then extend from the arcuate solid portions 42 and 46 of metallic members 30 and 32 outwardly for engagement with the nozzle actuating cylindrical sleeve 59 and have a slight curve inwardly at A, as the nozzle actuating cylindrical sleeve 59 is contacted, raising the free ends of fingers 36 off of the nozzle actuating cylindrical sleeve 59 and permitting fingers 34 to follow the contour of fingers 36 over the high temperature resistant cloth 38.

Outer metallic member 32 actually contacts the nozzle actuating cylindrical sleeve 59 and each finger 36 is bent inwardly and forwardly at its end, contacting cloth 38, to encompass the free end or ends of the high temperature resistant cloth 38 and fingers 34 of the inner metallic member 30. This traps the high temperature resistant cloth 38 between the metallic members 30 and 32 at their finger end. High pressure cooling air acts against the inner seal 30 (see arrows FIG. 4). This compresses the high temperature cloth between seal members 30 and 32, thus enhancing the sealing capability of the assembly by closing gaps created by manufacturing tolerances, etc.

To form the finger seal means 12 as an arcuate segment, the arcuate portions 42 and 46 are welded together to preform the finger seal means 12 for later use. These welds are placed at about three equally spaced locations 68. The high temperature resistant cloth 38 is cut out as at 74 to permit mating faces of the arcuate solid portions 42 and 46 to be pressed together as at B for forming a weld therebetween.

In assembling the seal construction 2, a predetermined number of arcuate segments are used to encircle the entire circumference of the rearwardly facing annular space formed between the cylindrical portion 8 and cylindrical portion 10 of flanges 4 and 6, respectively. An arcuate segment of the finger seal means 12 has its arcuate portions 42 and 46 positioned in the opening between the cylindrical portions 8 and 10. After the segment has been positioned, a plurality of holes are drilled through the cylindrical portion 8, arcuate solid portions 42 and 46 with the high temperature resistant cloth 38 therebetween, and through the cylindrical portion 10. These holes are placed approximately one per inch along the length of the segment. Blind rivets 58 are then placed through each of the openings to affix the finger seal means to the flanges 4 and 6. When the next segment is set into place, care is taken to be sure that the end of the metallic member 32 is placed over the high temperature resistant cloth 38 with the end of the finger 36 properly encompassing the free end, or ends, of the high temperature resistant cloth 38 and finger 34 of the inner metallic member 30. This segment is then fixedly mounted to the flanges 4 and 6.

It is noted that more than one layer of high temperature resistant cloth 38 can be used in a nozzle segment, said thickness of the high temperature resistant cloth 38 being determined by the internal clearance encountered by the finger seal means 12, this internal clearance being affected by manufacturing tolerances.

In a nozzle segment made and tested, a high temperature ceramic cloth was used, sold under the trademark of Nextel. In another construction built, three layers of high temperature resistant cloth were used of different materials—outer layers of Scotch No. 361 tape and a middle layer of PWA 36071 Polyimide film.

To reduce the thickness of the finger seal means 12 where it is inserted in the rearwardly facing annular space, where a plurality of high temperature resistant cloths are used, the middle layer, or layers, can stop approximately where the slots end (see "D" in FIG. 5).

I claim:

1. A seal means for use between a stationary member and a movable member, said seal means comprising two overlapping inner and outer metallic members each having a solid portion at one end and having slots forming fingers at the other end, said solid portions being contoured to fit a stationary member, said fingers of said outer metallic member being shaped to fit a movable member, said metallic members being offset so that the slots of each member are not aligned, a layer of high temperature resistant cloth positioned between said overlapping metallic members sealing flow through said slots and between said two metallic members.

2. A seal means as set forth in claim 1 wherein said high temperature resistant cloth extends for approximately the length and width of one of the metallic members, said outer metallic member having the ends of the fingers bent inwardly and back over the fingers of said inner metallic member enclosing said high temperature resistant cloth.

3. A seal means as set forth in claim 2 wherein said metallic members are of the same width and have the same number of fingers, said offset positioning of said metallic members leaving an extending portion of the inner metallic member at one end and an extending portion of the outer metallic member at the other end, said high temperature resistant cloth covering the extending portion of one of the metallic members.

4. A seal means as set forth in claim 2 wherein the solid portions of said inner and outer metallic members having the layer of high temperature resistant cloth between them are fixed together, said high temperature resistant cloth having openings therethrough at a plurality of locations between the solid portions of the inner and outer metallic members, said solid portion of inner and outer metallic members projecting towards each other through said openings and having surface engagement, each engaging location being spot welded to hold the solid portions of said inner and outer metallic members together.

5. A seal means as set forth in claim 1 wherein said high temperature resistant cloth is a high temperature ceramic cloth.

6. A seal means as set forth in claim 5 wherein said high temperature ceramic cloth is Nextel.

* * * * *